United States Patent
Deinlein et al.

(10) Patent No.: US 12,001,847 B1
(45) Date of Patent: Jun. 4, 2024

(54) PROCESSOR IMPLEMENTING PARALLEL IN-ORDER EXECUTION DURING LOAD MISSES

(71) Applicant: Apple Inc., Cupertino, CA (US)

(72) Inventors: Justin M Deinlein, Austin, TX (US); Michael L Karm, Cedar Park, TX (US); Brett S Feero, Lake Oswego, OR (US); David E Kroesche, Austin, TX (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/823,279

(22) Filed: Aug. 30, 2022

(51) Int. Cl.
*G06F 9/38* (2018.01)

(52) U.S. Cl.
CPC .......... *G06F 9/3867* (2013.01); *G06F 9/3842* (2013.01); *G06F 9/3861* (2013.01)

(58) Field of Classification Search
CPC ..... G06F 9/3867; G06F 9/3842; G06F 9/3861
See application file for complete search history.

(56) References Cited

U.S. PATENT DOCUMENTS

| | | |
|---|---|---|
| 2010/0306477 A1 | 12/2010 | Luttrell |
| 2014/0143523 A1* | 5/2014 | Chadha ................. G06F 9/3867 712/220 |
| 2014/0195772 A1 | 7/2014 | McCormick, Jr. |
| 2015/0095629 A1 | 4/2015 | Abdallah |
| 2018/0052691 A1* | 2/2018 | Dunham ................ G06F 9/3004 |
| 2020/0394039 A1* | 12/2020 | Kesiraju ................ G06F 9/3842 |
| 2021/0049015 A1* | 2/2021 | Chou .................... G06F 9/3861 |
| 2021/0056024 A1* | 2/2021 | Levinsky ............ G06F 12/0811 |

* cited by examiner

*Primary Examiner* — Shawn Doman
(74) *Attorney, Agent, or Firm* — Robert C. Kowert; Kowert, Hood, Munyon, Rankin & Goetzel, P.C.

(57) ABSTRACT

A processor may include an instruction pipeline that executes program instructions in-order according to a program order. During operation, the instruction pipeline may detect that data is missing for a first instruction. In response, the instruction pipeline may send a request to load the missing data for the first instruction. However, the instruction pipeline may not necessarily stall operation to wait for the missing data to be loaded. Instead, the instruction pipeline may continue executing instructions subsequent to the first instruction. During the continued execution, the instruction pipeline may detect that data is missing for a second instruction, and send a request to load the missing data for the second instruction. The instruction pipeline may continue such operation until it determines that a condition occurs that prevents the continued execution. When the condition occurs, the instruction pipeline may stop the continued execution, and then re-execute the first instruction.

20 Claims, 12 Drawing Sheets

PROCESSOR IMPLEMENTING PARALLEL IN-ORDER EXECUTION DURING LOAD MISSES

BACKGROUND

Technical Field

Embodiments described herein are related to an in-order processor and, more particularly, to processing of load misses in an in-order processor.

Description of the Related Art

Computing systems generally include one or more processors. The processors execute the control software (e.g., an operating system) that controls operation of computing devices and/or various peripherals. The processors can also execute applications, which provide user functionality in the system. Sometimes, a processor may implement an instruction pipeline that includes multiple stages, where instructions are divided into a series of steps to be individually executed at corresponding stages of the pipeline. As a result, multiple instructions may be processed in the processor in parallel at different stages. Sometimes, a processor may execute instructions in-order, e.g., the instructions may be fetched, decoded, executed, and retired according to the instructions' original order in the program. By comparison, sometimes a processor may execute instructions out-of-order, meaning that the processing of the instructions may not strictly follow the program order of the instructions. For example, the instructions may be fetched and decoded still in order, but executed in a different sequence. To distinguish, the former type of processors may be referred to as in-order processors, whereas the latter may be referred to as out-of-order processors.

A processor may be subject to load misses during execution of instructions. For example, when a load instruction is executed in a processor, ideally, data that are needed for execution of the instruction should already exist in the cache. However, sometimes the data may not be resident in the cache. This may be called load misses. For a traditional in-order processor, when a load miss happens, the processor not only must stall execution of the instruction that has the missing load, but also instructions subsequent to the instruction in order to maintain the executional order. The processor must wait until the missing data is successfully loaded and then resume operation of the pipeline to re-execute the instruction. This can be time-consuming and inefficient because operation of the pipeline may be repeatedly interrupted every time a load miss takes place. The situation may become even worse, when the processor is deeply pipelined such that multiple instructions may be executed in parallel within the pipeline and thus load misses may occur more frequently. Therefore, it is desirable to have designs provide more efficient solutions for in-order processors to process load misses.

BRIEF DESCRIPTION OF THE DRAWINGS

The following detailed description refers to the accompanying drawings, which are now briefly described.

Figure 1:
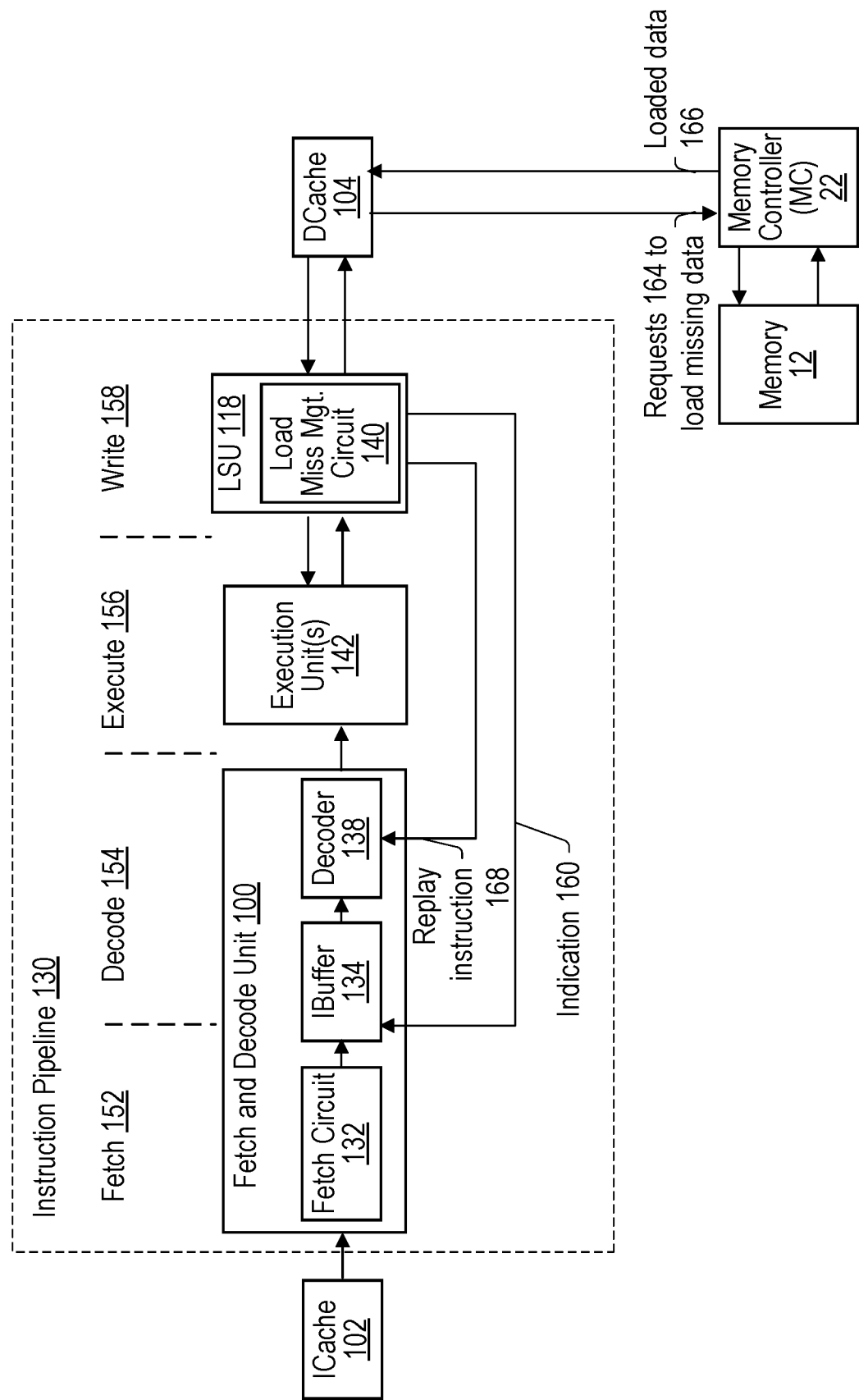
FIG. 1 is a block diagram of one embodiment of a portion of a processor including an in-order instruction pipeline that includes a load miss management circuit.

While embodiments described in this disclosure may be susceptible to various modifications and alternative forms, specific embodiments thereof are shown by way of example in the drawings and will herein be described in detail. It should be understood, however, that the drawings and detailed description thereto are not intended to limit the embodiments to the particular form disclosed, but on the contrary, the intention is to cover all modifications, equivalents and alternatives falling within the spirit and scope of the appended claims. The headings used herein are for organizational purposes only and are not meant to be used to limit the scope of the description.

DETAILED DESCRIPTION OF EMBODIMENTS

Turning now to FIG. 1, a block diagram of one embodiment of an instruction pipeline 130 of a processor 30 is shown. The instruction pipeline 130 may include one or more circuits configured to implement various stages of the pipeline. For example, the instruction pipeline 130 may include a fetch and decode unit or circuit 100 to implement instruction "fetch" stage 152 and "decode" stage 154. In the "fetch" stage 152, instructions may be fetched by a fetch circuit 132, e.g., from an instruction cache (ICache 102), to a decoder or decoding circuit 138 for decoding. As indicated in FIG. 1, sometimes the instruction pipeline 130 may include an instruction buffer (IBuffer) 134 which may serve as a "buffer" for the decoder 138 to store the fetched instructions temporarily before the instructions are decoded by the decoder 138. Sometimes, the instruction pipeline 130 may include an additional prefetch circuit (not shown) positioned operatively before the ICache 102. The prefetch circuit may load (also called prefetch) instructions from a memory system, e.g., memory 12, into the ICache 102. In the "decode" stage 154, the fetched instructions may be obtained by the decoder or decoding circuit 138, e.g., from the IBuffer 134, and decoded in to operations and/or micro-operations.

In addition, the instruction pipeline 130 may include one or more execution units or circuits 142 to implement an "execute" stage 156. In the "execute" stage 156, the decoded instructions may be executed by the execution units 142, using data loaded by a load/store unit or circuit (LSU) 118. In the "write" stage 158, results generated from execution of the instructions may be stored by the LSU 118 to a cache (e.g., data cache or DCache 104) and/or memory (e.g., memory 12). As indicated in FIG. 1, sometimes the processor 30 may further include one or more register files 114, which may be used by the execution units 142 and LSU 118 to transfer data. For example, when the execution units 142 require data to execute an instruction, the LSU 118 may first load the data from DCache 104 (e.g., when the data is cacheable data from cacheable memory) and/or memory 12 (e.g., when the data is cacheable data but not available in DCache 104, or from non-cacheable or device memory) to the register files 114, and the execution units 142 may then obtain the data to execute an instruction. Similarly, when the execution units 142 generate a result, the execution units 142 may first store the result to the register files 114, and the LSU 118 may then obtain the result from the register files 114 to store it to the DCache 104 and/or memory 12.

In the illustrated embodiment, the processor 30 may be an in-order processor that executes program instructions according to their original order in the software program. For example, the instruction pipeline 130 may fetch, decode, and execute instructions and write results of the instructions according to a program order, e.g., an order between the instructions in the corresponding software program. Also, note that FIG. 1 is provided only as an example for purposes of illustration. The dashed lines are provided only as an example to illustrate the different stages of the instruction pipeline. The dashed lines are not provided as strict boundaries between circuits of the instruction pipeline for the different stages, and instead they may be arbitrarily relocated with respect to the structural boundaries between the circuits in other embodiments. Also, sometimes, each stage of processor 30 may include more or less circuits or components than what are shown in FIG. 1. For example, in one embodiment, the instruction pipeline 130 may include an instruction scheduling and dispatch circuit between the "decode" stage 154 and "execute" stage 156, which may be configured to schedule and distribute (also called issue) decoded instructions for execution.

Sometimes, the instruction pipeline 130 may include a load miss management circuit 140. As indicated in FIG. 1, in the illustrated embodiment, the load miss management circuit 140 may be implemented as part of the LSU unit 118. Note that this is only an example for purposes of illustration. In one embodiment, the load miss management circuit 140 may be separate from the LSU unit 118 but still operatively coupled with the LSU 118 to perform processing of load misses. In the illustrated embodiment, the load miss management circuit 140 may be configured to detect that data is missing for a first instruction. For example, the data is not available in the DCache 104 (when the data is cacheable data from cacheable memory), or has not been loaded into the instruction pipeline 130 and thus not available (when the data is non-cacheable data from non-cacheable or device memory), when the execution units 142 are ready to execute the first instruction. Sometimes, the scenario is also called "cache miss" when required data is not found in the cacheable memory, where called "cache hit" when the data is available in the cacheable memory.

Different from traditional in-order processors, the processor 30 may not necessarily stall operation of the instruction pipeline 130. For example, when the instruction pipeline 130 detects that data is missing for a first instruction, the instruction pipeline 130 may send a request (e.g., to MC 22) to load the missing data for the first instruction. However, the instruction pipeline 130 may not necessarily stop its operation to wait for the missing data of the first instruction to be loaded. Instead, the instruction pipeline 130 may continue to execute one or more additional instructions subsequent to the first instruction before the missing data is loaded, until it determines that a condition occurs that prevents the continued execution of the subsequent instructions. To simply the description, in this disclosure, the continued execution of instructions after detecting that data is missing for an instruction is also called "speculative execution." During the speculative execution, if any of the additional instructions (e.g., a second instruction) that are executed subsequent to the first instruction also has missing data, instruction pipeline 130 may also send corresponding requests to load the missing data for the additional instructions, and continue the speculative execution until the condition occurs that prevents the speculative execution. When the condition occurs, the instruction pipeline may stop the speculative execution, and re-execute the instructions that previously had missing data using the missing data that are loaded into the instruction pipeline or cache.

Compared to traditional in-order processors, the disclosed processor 30 can provide several benefits. For example, different from traditional in-order processors, the processor 30 may not have to stop its instruction pipeline to wait for loading of missing data every time a load miss happens. Instead, the processor 30 may continue to execute instructions after detection of a load miss and before the missing data returns, until the moment when it determines a condition occurs that prevents such speculative execution. During the speculative execution, the processor may continue to send out load requests for missing data of additional instructions being executed, and not necessarily stop and wait for return of the missing data for each individual load miss. Thus, this can greatly improve efficiency of an in-order processor. In addition, as described below, in case the missing data for the multiple instructions are returned from reloading but out of order, the processor 30 may place the re-loaded data back in order to maintain the executional order between the instructions. Therefore, it will not impact the in-order requirement of the pipeline's operation.

Referring back to FIG. 1, for purposes of illustration, processing of the load misses will be described with respect to the following example code:

| | |
|---|---|
| c = a + b; | // the $1^{st}$ instruction |
| f = d + e; | // the $2^{nd}$ instruction |
| h = f + g; | // the $3^{rd}$ instruction |
| ... | // the $4^{th}$ instruction |
| if (c > 0) | |
| { | |
| ... | |
| } | |
| else | |
| { | |
| ... | |
| } | |

In this example, during operation of the instruction pipeline 130, the load miss management circuit 140 may detect that data (e.g., operand "b") is missing for the $1^{st}$ instruction. In the illustrated embodiment, the load miss management circuit 140 may cause the instruction pipeline 130 to send a $1^{st}$ request 164 to load the missing data (e.g., operand "b") for the 1st instruction. For example, the instruction pipeline 130 may send the 1st request 164 to DCache 104, and if not available in the DCache 104, to the MC 22, to load the missing data from a secondary storage, e.g., memory 12, as indicated in FIG. 1, if the missing data is not available in a cache. However, instead of pausing operation to wait for the missing data returns 166, the instruction pipeline 130 may continue to execute one or more additional instructions subsequent to the 1st instruction, even after detecting that the 1st instruction has missing data. For example, the instruction pipeline 130 may proceed to execute the 2nd instruction. In addition, in the illustrated embodiment, the load miss management circuit 140 may cause an indication 160 to be generated to signify that the 1st instruction is not successfully executed because of a load miss. As a result, the load miss management circuit 140 may cause the instruction pipeline 130 to retain the 1st instruction in the IBuffer 134, e.g., to be kept in a data structure such as an instruction queue, so that the 1st instruction may later be re-executed after its missing data is re-loaded. As described below, when there are several instructions in the IBuffer 134, the indication 160 may also indicate a point from which the later re-execution is to start.

In the illustrated embodiment, the 2nd instruction in the example code may be executed independently from the 1st instruction, since execution of the 2nd second instruction does not require the missing data (e.g., operand "b") or other data (e.g., result "c") dependent on the missing data of the 1st instruction. It is possible that the 2nd instruction also has a cache miss, e.g., operand "d" is missing. In that case, the load miss management circuit 140 may cause the instruction pipeline 130 to also send a 2nd request 164 to load the missing data (e.g., operand "d") and continue the speculative execution of instructions. Conversely, if the 2nd instruction does not have a cache miss, the 2nd instruction may be executed by the instruction pipeline 130, e.g., using an execution unit 142, and generate a result (e.g., result "f"). Sometimes the 2nd instruction may need to be re-executed when the 1st instruction gets re-executed, regardless of whether or not the 2nd instruction has a load miss, because the 2nd instruction is behind the 1st instruction, and the instruction pipeline 130 is an in-order pipeline where the instructions need to be executed and the results to be committed in-order. Thus, in the illustrated embodiments, the 2nd instruction may be also stored in the IBuffer 134, like the 1st instruction. As described above, the indication 160 may indicate the point to start the re-execution. Thus, when the instruction pipeline 130 re-executes the 1st instruction, it may sequentially re-execute all the instructions that are speculatively executed regardless of whether they have a cache miss or not. Conversely, sometimes the load miss management circuit 140 may track which instructions speculatively executed (after the 1st detected load miss for the 1st instruction) indeed have a load miss, and only those instructions that truly have the load miss may be re-executed. For example, as described above, if the 2nd instruction does not have a load miss, even if it is speculatively executed subsequent to the 1st instruction, the 2nd instruction may not necessarily be re-executed. The instruction pipeline 130 may re-execute the 1st and 4th instructions that truly have load misses. The instruction pipeline 130 may not necessarily re-execute the 2nd instruction, and instead write the previous generated result (e.g., the result "f") from the speculative execution of the 2nd instruction to a register file which may then be stored (e.g., by a load/store unit or LSU) to the memory. This may reduce the number of instructions to be re-executed and allow the processor 30 to reuse previously-calculated results, thus improving the computational speed and performance of the processor.

Referring back to the above example, when the instruction pipeline 130 executes the 2nd instruction to generate the result "f," in the illustrated embodiment, the instruction pipeline 130 may transfer the result "f" to another instruction subsequent to the 2nd instruction, e.g., the 3rd instruction if the other instruction needs the result "f" for the speculative execution. This way, the continued execution of the 3rd instruction may still proceed when the result "f" is available, even though missing data (e.g., operand "b") has been detected for a previous instruction (e.g., the 1st instruction). Given that the result "f" is a result generated during the speculative execution, in this disclosure, the result "f" is also called an "intermediate" result meaning that it may be overwritten once the 2nd instruction is re-executed and another result is generated.

In this example, the 3rd instruction may be speculatively executed using the result "f" from the 2nd instruction, when the other operand "g" is available. In that case, the instruction pipeline 130 may execute the 3rd instruction to generate the result "h." Again, similar the 2nd instruction, the instruction pipeline 130 may keep the 3rd instruction in the IBuffer 134 for a later re-execution. The above operations may continue until the instruction pipeline determines that a condition occurs that prevents such continued execution. During this speculative execution, if there are one or more additional instructions are detected to have load misses, the instruction pipeline 130 may send requests to load missing data for these additional instructions as well. In this example, the speculative execution may continue until the instruction pipeline 130 proceeds to the 4th instruction. It may determine that the 4th instruction depends on the 1st instruction, because the operand "c" of the 4th instruction is the result of the 1st instruction. Given that execution of the 1st instruction does not produce a valid result because of the data missing, the result "c" (which is also the operand of the 4th instruction) is not generated and thus not available. As a result, the instruction pipeline 130 may not continue the execution of the 4th instruction, and accordingly it may stop the continued execution. Similar to what is described above, the instruction pipeline 130 may keep the 4th instruction in the IBuffer 134 for a later re-execution.

In the illustrated embodiment, when the instruction pipeline 130 determines that a condition occurs that prevents the continued execution of instructions subsequent to the detection of missing data for the 1st instruction, the instruction pipeline 130 may stop the continued execution. In addition, the instruction pipeline 130 may re-execute the 1st instruction. As described above, sometimes the instruction pipeline 130 may store the 1st instruction in the IBuffer 134. Thus, to re-execute the instruction, the instruction pipeline 130 may send a replay instruction 168 to decoder 138 to re-decode the 1st instruction stored in the IBuffer 134. Sometimes, the re-execution may be after the missing data of the 1st instruction is loaded. Conversely, sometimes, the re-execution may not necessarily have to wait until the missing data of the 1st instruction is loaded. Rather, the re-execution of the 1st instruction may get started ahead of time according to a predetermined duration, e.g., a duration sufficient for loading the missing data, such that when the 1st instruction is re-decoded and sent to the execution unit 142, the loading of the missing data is completed and the missing data becomes available. This can further reduce the delays and improve efficiency of the processor. Either way, the instruction pipeline 130 may re-execute the 1st instruction using the data returned from the loading. Also, as described above, the other instructions behind the 1$^{st}$ instruction that were speculatively executed may also be re-executed by the instruction pipeline 130.

In the illustrated embodiment, the transfer of an intermediate result (e.g., the result "f") from an earlier instruction (e.g., the 2$^{nd}$ instruction) to a later instruction (e.g., the 3$^{rd}$ instruction) during the speculative execution may be implemented using a "bypass network," such as a buffer memory. The bypass network may only store the intermediate result temporarily. Thus, when an additional instruction attempts to access the result, e.g., another instruction after the 3$^{rd}$ instruction attempting to access the result "f," the result may not necessarily be available anymore. In that case, the instruction pipeline may determine that a condition occurs that prevents the continued execution, and accordingly stop the continued execution of instructions. Note that the intermediate result may not be written to a register file of the processor, since one or more older instructions have not yet completed. Sometimes, the processor may use "scoreboard" bits to mark a register if an intermediate result would otherwise modify the register. For example, when the processor is supposed to write the result "f" to a register, instead of writing the result "f" to the register, the processor may write a "scoreboard" bit to the register to indicate that this register contains a stale value. Thus, when a later instruction attempts to access the register, the processor may recognize that the later instruction's access is directed to a stale value. When the value is also not available in the bypass network, the processor may stop the speculative execution, as described above.

Sometimes, the processor 30 may be a superscalar processor that has more than one instruction pipeline. In that case, the above-described operations may still apply. For example, the processor 30 may maintain be a fixed executional order between the multiple instruction pipelines. For example, if the processor 30 has two instruction pipelines, the processor 30 may distribute a first to the first pipeline first, a second instruction to the second pipeline next, a third instruction back to the first pipeline, and so on. In other words, there may be fixed order between the instructions within the two pipelines. Thus, after a load miss is detected for one instruction in one pipeline, the processor 30 may use the ordering information between the two pipelines to track the instructions to perform the speculative execution.

Figure 2:
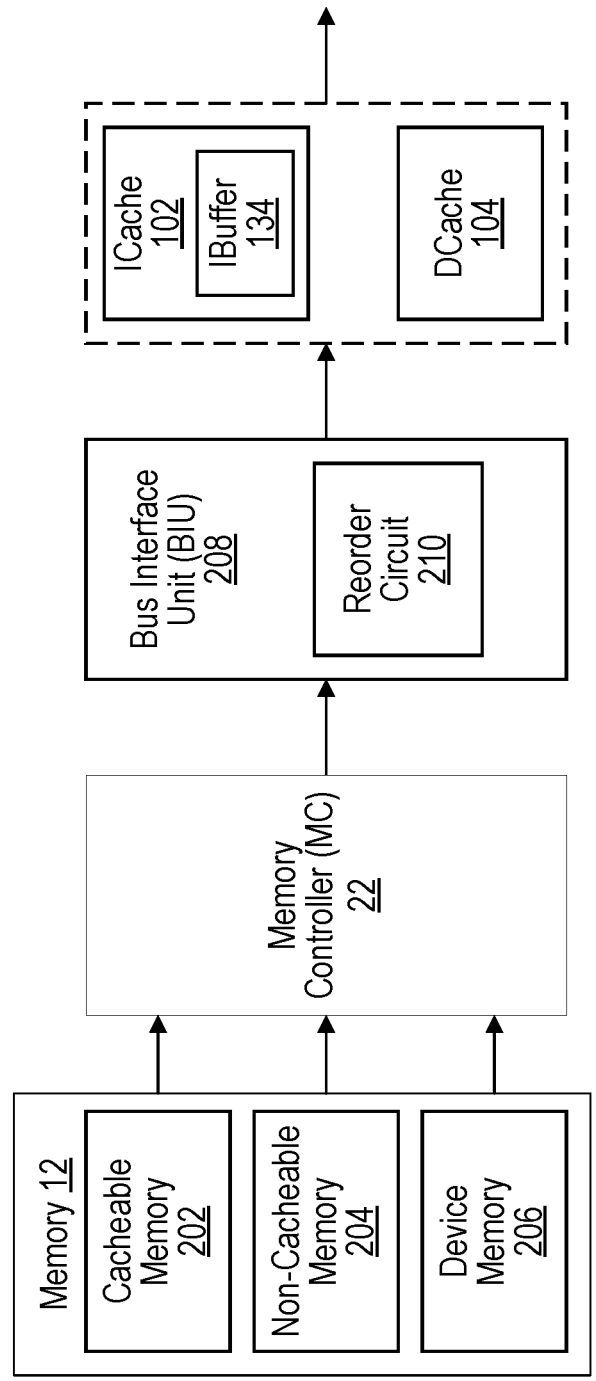
FIG. 2 is a block diagram of one embodiment of a memory system of a processor.

Turning now to FIG. 2, a block diagram of one embodiment of a memory system of a processor 30 is shown. As described above, in the illustrated embodiment, the processor 30 may have access to the memory 12, e.g., via the MC 22. Sometimes, the memory 12 may be a secondary memory, and in addition to memory 12, the processor 30 may include a level 1 (L1) instruction cache (ICache) 102, a level 1 (L1) data cache (Dcache) 104, and a bus interface unit (BIU) 208. The L1 ICache 102 and DCache 104 may be implemented using circuits distinct from each other. The ICache 102 may be configured to store instructions, whereas the DCache 104 may be configured to store data for the instructions. In addition, sometimes the L1 ICache 102 may also include the IBuffer 134. Alternatively, the IBuffer 134 may be part of the decoder 138 within the instruction pipeline 130. In the illustrated embodiment, the BIU 208 may serve as an intermediate layer between the L1 ICache 102 and DCache 104 and the memory 12. The BIU 208 may handle the transfer of data and/or addresses between the L1 caches (e.g., ICache 102 and DCache 104) and MC 22. For example, the MC 22 may receive requests (e.g., read requests and/or write requests) from the instruction pipeline 130 of the processor 30, through the BIU 208, to load instructions and data from the memory 12 and/or store data to the memory 12. The instructions may be moved, through the BIU 208, and stored to the ICache 102, and the data may be moved, through the BIU 208, to the instruction pipeline 130. Further, if the data is loaded from cacheable memory 202, the data may be stored to DCache 104.

As indicated in FIG. 2, in the illustrated embodiment, the memory 12 may include different types of memory spaces, e.g., cacheable memory 202, non-cacheable memory 204, and device memory 206. The different types of memory may correspond to different memory attributes. Different instructions may have different memory instruction types accessing different types of memory. For example, the cacheable memory 202 may include a region of memory whose data may be stored to a cache (e.g., DCache 104) of the processor 30. By comparison, the non-cacheable memory 204 and device memory 206 may include regions of memory whose data may not necessarily be stored to any cache of the processor 30 or the regions of memory that may not necessarily be looked up in any cache of the processor 30. Instead, the data may be loaded from the non-cacheable memory 204 and device memory 206 directly to the instruction pipeline 130. For example, sometimes the data from the non-cacheable memory 204 and device memory 206 may be sent directly to the LSU 118. Sometimes, the processor 30 may include a buffer to temporarily store the data from the non-cacheable memory 204 and device memory 206. However, the buffer may be different from the cache (e.g., DCache 104) of the processor 30, purpose-wise and/or structure-wise. For example, the DCache 104 may be used primarily to store data for reuse, whereas the buffer may mainly store data temporarily before the data are loaded and/or used for execution of instructions. Also, read requests to the non-cacheable memory 204 may over-read in memory, and may satisfy multiple memory requests with a single memory access. Write requests to the non-cacheable memory 204 may be merged with other write requests to the same bytes of nearby bytes. The device memory 206 may include a region of memory used for communicating with input and output devices and memory-mapped peripherals of the processor 30. Further, read and/or write requests to the device memory 206 may need to be strongly ordered, e.g., one request may act as a memory barrier to all other requests until the request is complete.

As indicated in FIG. 2, in the illustrated embodiment, the BIU 208 may include a reorder circuit 201 that may place multiple data loaded from the memory 12 according to the program order of the corresponding instructions. For example, as described above, the instruction pipeline 130 may send multiple requests 164 to the MC 22 to load multiple missing data for multiple instructions. However, the loading of the missing data may take different amounts of time, and they may not necessarily return in order. Therefore, the BIU 208 may use the reorder circuit 120 to re-order the returned data back in order such that, from the perspective of the instruction pipeline 130, these data may be returned in sequence just like the way it would occur without load misses. Sometimes, the processor may include a level 2 (L2) cache operatively positioned between the L1 caches (e.g., ICache 102 and DCache 104) and MC 22. In that case, the recorder circuit 210 may be implemented as part of the L2 cache.

In the illustrated embodiment, the processor 30 may not necessarily mix the load misses of instructions of different memory instruction types. For example, as described above, the processor 30 may determine that an earlier instruction with missing data has a memory instruction type corresponding to cacheable memory 20, or in other words, the missing data resides in the cacheable memory 202. If during continued execution after the detection of the missing data of the earlier instruction, when the processor 30 detects a later instruction with missing data has a memory instruction type correspond to non-cacheable memory 204, or in other words, the missing data does not reside in the cacheable memory 204, the processor 30 may determine that a condition occurs that prevents the continued execution, and thus stop the continued execution.

In addition, sometimes, the processor may determine that a condition occurs that prevents the continued execution, when the number of instructions in the IBuffer 134 waiting to be re-executed exceeds a size limit of the IBuffer 134. In that case, the IBuffer 134 may not be able to further store instructions, and thus the processor may have to stop the continued execution. Sometimes, the processor 30 may be configured such that the size of the IBuffer 134 may be large enough, e.g., larger than the depth (e.g., the number of stages) of the instruction pipeline 130, to minimize or prevent this condition to happen. Sometimes, the processor may determine that the condition occurs when the first detected missing data is successfully loaded, or in other words, when the first load miss is filled. For example, in the above discussed example code, if the missing data (e.g., operand "b") of the $1^{st}$ instruction is loaded, the processor 30 may stop the continued execution, even though one of the previously described conditions has not yet been detected (e.g., the instruction queue runs out of entries, dependency between instructions is detected, and/or load misses for instructions of different memory instruction types are detected). This way, the processor 30 may prioritize the re-execution and completion of the $1^{st}$ instruction once its missing data becomes available.

Sometimes, for multiple missing data requests to the same cache line of the non-cacheable memory 204, the instruction pipeline 130 may combine the multiple requests in to one single request. Here, the term "cache line" refers to a range of addresses of the non-cacheable memory 204.

Figure 3:
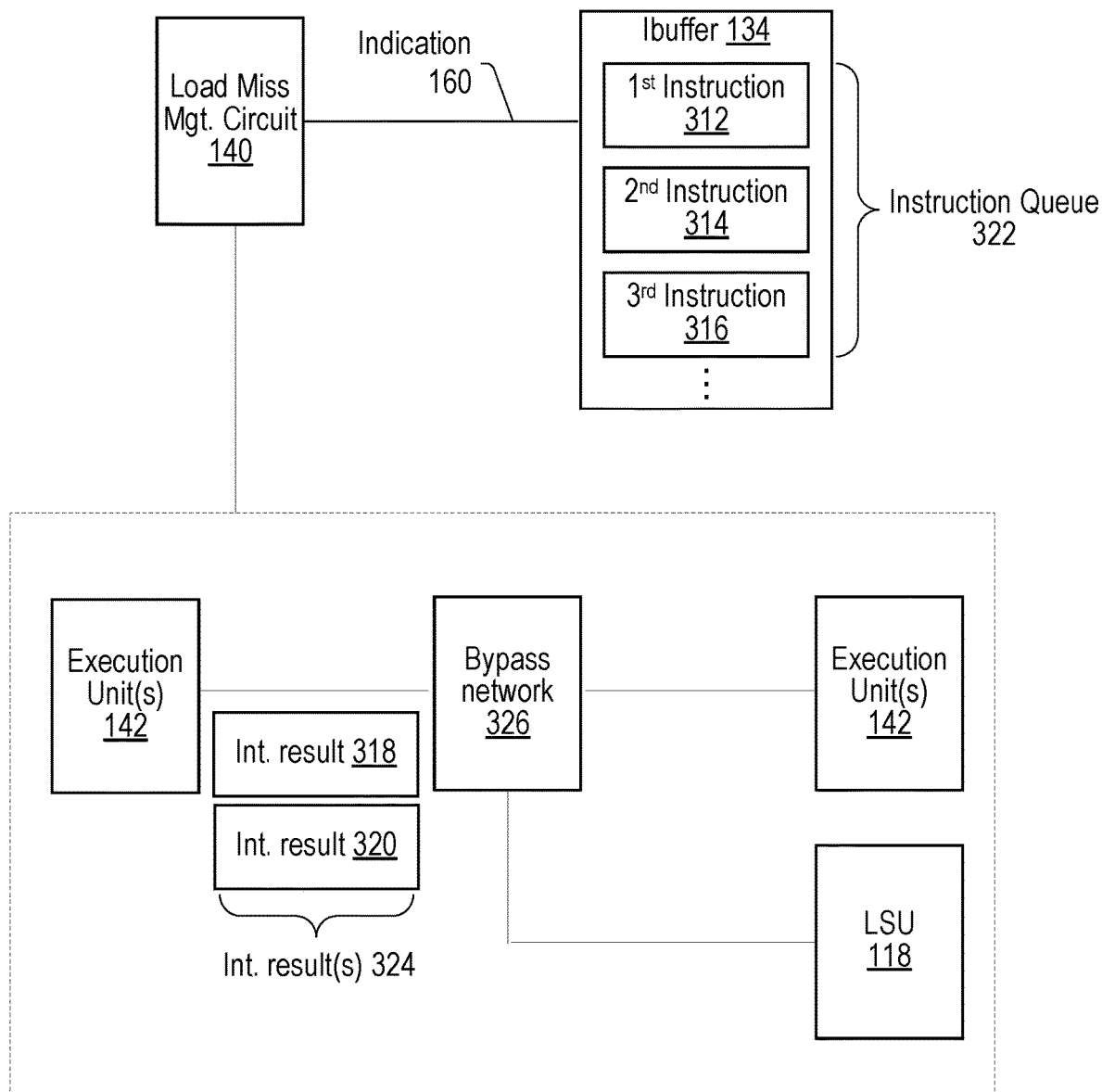
FIG. 3 is a block diagram to illustrate more details of load misses processing by a processor.

Turning now to FIG. 3, a block diagram to illustrate more details of load miss processing by a processor 30 is shown. As described above, when detecting that data is missing for the $1^{st}$ instruction 312, the load miss management circuit 140 may cause the $1^{st}$ instruction 312, as well as the instructions 314 and 316 subsequent to the first instructions 312, to be stored in an instruction queue 322 (e.g., using IBuffer 134). In addition, the load miss management circuit 140 may cause an indication 160 to be generated to indicate the point from which to start the re-execution of the instructions 312-316, after the continued execution stops. As described above, sometimes all the instructions in the instruction queue 322, including the instruction with the first detected load miss (e.g., the $1^{st}$ instruction in the above-described example code), and the instructions subsequently executed until the last instruction with which the instruction pipeline determines occurrence of a condition that prevents the continued execution (e.g., the $4^{th}$ instruction in the above-described example), may be re-executed. Alternatively, sometimes only the instructions in the instruction 322 that truly have load misses may be re-executed. In addition, during the continued execution, one or more intermediate results 316 and 320 may be generated and transferred from an earlier instruction to a later instruction through bypass network 326, without having to access the register file. Depending on the nature of the intermediate results, they may be bypassed from one execute unit to another or the same execute unit 142, and/or the LSU 118. For example, an instruction executed in one execution unit 142 may calculate the address needed for a subsequent load instruction. This address may be transferred through the bypass network 326 to the LSU unit 118.

Figure 4:
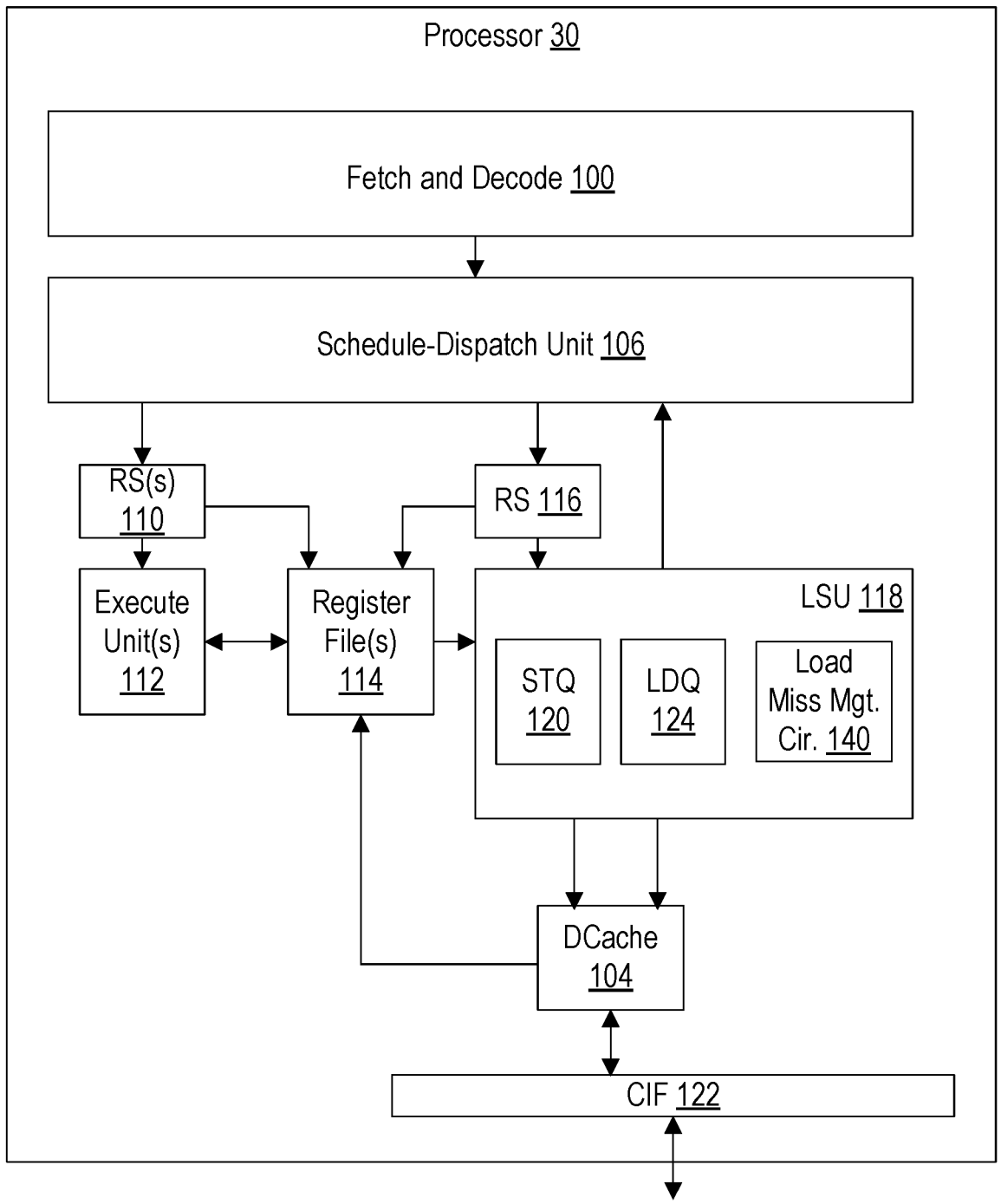
FIG. 4 is a block diagram of one embodiment of a processor shown in FIGS. 1-3 that includes a load miss management circuit.

FIG. 4 is a block diagram of one embodiment of a processor 30 that includes a load miss management circuit 140 as described above. In the illustrated embodiment, the processor 30 includes a fetch and decode unit 100, a schedule-dispatch unit 106, one or more reservation stations 110, one or more execute units 112, one or more register files 114, a data cache (DCache) 104, a load/store unit (LSU) 118, a reservation station (RS) for the load/store unit 116, and a core interface unit (CIF) 122. The fetch and decode unit 100 is coupled to the schedule-dispatch unit 106, which is coupled to the reservation stations 110, the reservation station 116, and the LSU 118. The reservation stations 110 are coupled to the execution units 112. The register file 114 is coupled to the execution units 112 and the LSU 118. The LSU 118 is also coupled to the DCache 104, which is coupled to the CIF 122 and the register file 114. The LSU 118 includes a store queue 120 (STQ 120) and a load queue (LDQ 124).

The fetch and decode unit 100 may be configured to fetch instructions for execution by the processor 30 and decode the instructions into operations (or ops) and/or micro-operations (or μops) for execution. More particularly, the fetch and decode unit 100 may be configured to cache instructions previously fetched from memory (through the CIF 122) in the ICache 102, and may be configured to fetch a speculative path of instructions for the processor 30.

The fetch and decode unit 100 may be configured to decode the instructions into instruction operations. In some embodiments, a given instruction may be decoded into one or more instruction operations, depending on the complexity of the instruction. Particularly complex instructions may be microcoded, in some embodiments. In such embodiments, the microcode routine for the instruction may be coded in instruction operations. In other embodiments, each instruction in the instruction set architecture implemented by the processor 30 may be decoded into a single instruction operation, and thus the instruction operation may be essentially synonymous with instruction (although it may be modified in form by the decoder). The term "instruction operation" may be more briefly referred to herein as "operation" or "op."

The schedule-dispatch unit 106 may be configured to schedule and distribute the ops (generated from the decoding) to the reservation stations 110 and 116. Ops may be scheduled for execution when the source operands for the ops are ready. In the illustrated embodiment, decentralized scheduling is used for each of the execution units 28 and the LSU 118, e.g., in reservation stations 116 and 110. Other embodiments may implement a centralized scheduler if desired.

The LSU 118 may be configured to execute load/store memory ops. Generally, a memory operation (memory op) may be an instruction operation that specifies an access to memory (although the memory access may be completed in a cache such as the DCache 104). A load memory operation may specify a transfer of data from a memory location to a register, while a store memory operation may specify a transfer of data from a register to a memory location. Load memory operations may be referred to as load memory ops, load ops, or loads; and store memory operations may be referred to as store memory ops, store ops, or stores. In an embodiment, store ops may be executed as a store address op and a store data op. The store address op may be defined to generate the address of the store, to probe the cache for an initial hit/miss determination, and to update the store queue with the address and cache info. Thus, the store address op may have the address operands as source operands. The store data op may be defined to deliver the store data to the store queue. Thus, the store data op may not have the address operands as source operands, but may have the store data operand as a source operand. In many cases, the address operands of a store may be available before the store data operand, and thus the address may be determined and made available earlier than the store data. The remainder of this disclosure will often use store address ops (and store data ops) as an example, but implementations that do not use the store address/store data optimization are also contemplated. The address generated via execution of the store address op may be referred to as an address corresponding to the store op.

As described above, in the illustrated embodiment, the LSU 118 may include a load miss management circuit 140 to process load misses of instructions. As described above, the load miss management circuit 140 may detect a load miss for a first instruction. However, the processor 30 may not necessarily pause the operations to wait for the missing data to be loaded, but rather continuously execute one or more additional instructions subsequent to the first instruction until determining that a condition occurs that prevents the continued execution. During the continued execution, the load miss management circuit may detect load misses for one or more additional instructions, and accordingly send out corresponding requests to load the missing data for those instructions. Such operations may continue until a condition occurs that prevents continued execution. At that time, the processor 30 may stop the continued execution, and re-execute from the first instruction that is detected to have missing data.

Load/store ops may be received in the reservation station 116, which may be configured to monitor the source operands of the operations to determine when they are available and then issue the operations to the load or store pipelines, respectively. Some source operands may be available when the operations are received in the reservation station 116, which may be indicated in the data received by the reservation station 116 from the schedule-dispatch unit 106 for the corresponding operation. Other operands may become available via execution of operations by other execution units 112 or even via execution of earlier load ops. The operands may be gathered by the reservation station 116, or may be read from a register file 114 upon issue from the reservation station 116.

The LDQ 124 may track loads from initial execution to retirement by the LSU 118. The LDQ 124 may be responsible for ensuring the memory ordering rules are not violated. When a load/store address op is issued by the reservation station 116, the LSU 118 may be configured to generate the address accessed by the load/store, and may be configured to translate the address from an effective or virtual address created from the address operands of the load/store address op to a physical address actually used to address memory. The LSU 118 may be configured to generate an access to the DCache 104. For load operations that hit in the DCache 104, data may be forwarded from the DCache 104 to the destination operand of the load operation (e.g., a register in the register file 114), unless the address hits a preceding operation in the STQ 120 (that is, an older store in program order) or the load is replayed. The data may also be forwarded to dependent ops that were speculatively scheduled and are in the execution units 112. The execution units 112 may bypass the forwarded data in place of the data output from the register file 114, in such cases. If the store data is available for forwarding on a STQ hit, data output by the STQ 120 may be forwarded instead of cache data. Cache misses and STQ hits where the data cannot be forwarded may be reasons for replay and the load data may not be forwarded in those cases. The cache hit/miss status from the DCache 104 may be logged in the STQ 120 or LDQ 124 for later processing.

The LSU 118 may implement multiple load pipelines. For example, in an embodiment, three load pipelines ("pipes") may be implemented, although more or fewer pipelines may be implemented in other embodiments. Each pipeline may execute a different load, independent and in parallel with other loads. That is, the RS 116 may issue any number of loads up to the number of load pipes in the same clock cycle. The LSU 118 may also implement one or more store pipes, and in particular may implement multiple store pipes. The number of store pipes need not equal the number of load pipes, however. In an embodiment, for example, two store pipes may be used. The reservation station 116 may issue store address ops and store data ops independently and in parallel to the store pipes. The store pipes may be coupled to the STQ 120, which may be configured to hold store operations that have been executed but have not committed.

The CIF 122 may be responsible for communicating with the rest of a system including the processor 30, on behalf of the processor 30. For example, the CIF 122 may be configured to request data for DCache 104 misses and ICache 102 misses. When the data is returned, the CIF 122 may signal the cache fill to the corresponding cache. For DCache fills, the CIF 122 may also inform the LSU 118. The LDQ 124 may attempt to schedule loads that are waiting on the cache fill so that the replayed loads may forward the fill data as it is provided to the DCache 104 (referred to as a fill forward operation). If the load needing replay is not successfully replayed during the fill, it may subsequently be scheduled and replayed through the DCache 104 as a cache hit. The CIF 122 may also writeback modified cache lines that have been evicted by the DCache 104, merge store data for non-cacheable stores, etc.

The execution units 112 may include any types of execution units in various embodiments. For example, the execution units 112 may include integer, floating point, and/or vector execution units. Integer execution units may be configured to execute integer ops. Generally, an integer op is an op which performs a defined operation (e.g., arithmetic, logical, shift/rotate, etc.) on integer operands. Integers may be numeric values in which each value corresponds to a mathematical integer. The integer execution units may include branch processing hardware to process branch ops, or there may be separate branch execution units.

Floating point execution units may be configured to execute floating point ops. Generally, floating point ops may be ops that have been defined to operate on floating point operands. A floating point operand is an operand that is represented as a base raised to an exponent power and multiplied by a mantissa (or significand). The exponent, the sign of the operand, and the mantissa/significand may be represented explicitly in the operand and the base may be implicit (e.g., base 2, in an embodiment).

Vector execution units may be configured to execute vector ops. Vector ops may be used, e.g., to process media data (e.g., image data such as pixels, audio data, etc.). Media processing may be characterized by performing the same processing on significant amounts of data, where each datum is a relatively small value (e.g., 8 bits, or 16 bits, compared to 32 bits to 64 bits for an integer). Thus, vector ops include single instruction-multiple data (SIMD) or vector operations on an operand that represents multiple media data.

Thus, each execution unit 112 may comprise hardware configured to perform the operations defined for the ops that the particular execution unit is defined to handle. The execution units may generally be independent of each other, in the sense that each execution unit may be configured to operate on an op that was issued to that execution unit without dependence on other execution units. Viewed in another way, each execution unit may be an independent pipe for executing ops. Different execution units may have different execution latencies (e.g., different pipe lengths). Additionally, different execution units may have different latencies to the pipeline stage at which bypass occurs, and thus the clock cycles at which speculative scheduling of depend ops occurs based on a load op may vary based on the type of op and execution unit 28 that will be executing the op.

It is noted that any number and type of execution units 112 may be included in various embodiments, including embodiments having one execution unit and embodiments having multiple execution units.

A cache line may be the unit of allocation/deallocation in a cache. That is, the data within the cache line may be allocated/deallocated in the cache as a unit. Cache lines may vary in size (e.g., 32 bytes, 64 bytes, 128 bytes, or larger or smaller cache lines). Different caches may have different cache line sizes. The ICache 102 and DCache 104 may each be a cache having any desired capacity, cache line size, and configuration. There may be more additional levels of cache between the DCache 104/ICache 102 and the main memory, in various embodiments.

Figure 5:
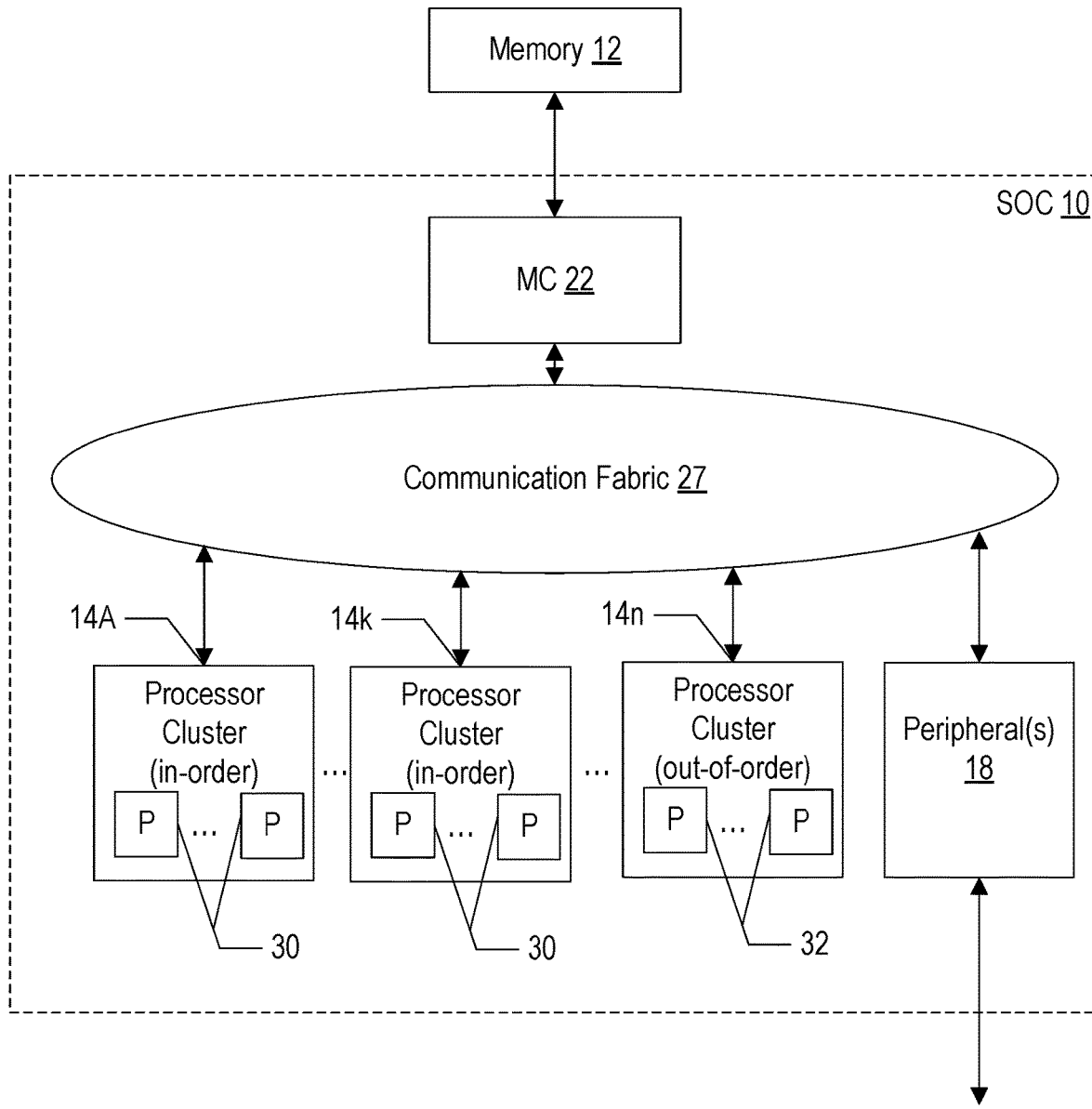
FIG. 5 is a block diagram of one embodiment of system on a chip (SOC) that may include one or more processors shown in FIGS. 1-4.

Turning now to FIG. 5, a block diagram one embodiment of a system 10 implemented as a system on a chip (SOC) 10 is shown coupled to a memory 12. As implied by the name, the components of the SOC 10 may be integrated onto a single semiconductor substrate as an integrated circuit "chip." In some embodiments, the components may be implemented on two or more discrete chips in a system. However, the SOC 10 will be used as an example herein. In the illustrated embodiment, the components of the SOC 10 include a plurality of processor clusters 14A-14n, one or more peripheral components 18 (more briefly, "peripherals"), a memory controller 22, and a communication fabric 27. The components 14A-14n, 18, and 22 may all be coupled to the communication fabric 27. The memory controller 22 may be coupled to the memory 12 during use. In some embodiments, there may be more than one memory controller coupled to corresponding memory. The memory address space may be mapped across the memory controllers in any desired fashion.

In the illustrated embodiment, the processor clusters 14A-14n may include the respective plurality of same or different processors (P) 30 and 32 as shown in FIG. 5. For example, the processor clusters 14A-14k may respectively include one or more in-order processors 30, whereas at least the processor cluster 14n may include one or more out-of-order processors 32. In the illustrated embodiment, the processors 30(1)-30(n) may be assigned to perform lightweight and/or dedicated tasks, such as processing of image data, audio data, data associated with touch screens, etc., whereas the processor 32 may serve as a central processing unit (CPU) of the SOC 10 to perform heavy-weight tasks such as the main control software (e.g., an operating system) of the SOC 10. Generally, software executed by the CPU during use may control the other components of the system to realize the desired functionality of the system. The processor 32 may also execute other software, such as application programs. The application programs may provide user functionality, and may rely on the operating system for lower-level device control, scheduling, memory management, etc. The processors 30 may individually include a load miss management circuit 140, as described above, to process load misses for the respective processors. Sometimes, the processors 30 may be implemented using purposefully designed circuits, ASICs, and/or general logic circuits (e.g., FPGA) with purposefully designed software and/or IP cores.

Generally, a processor may include any circuitry and/or microcode configured to execute instructions defined in an instruction set architecture implemented by the processor. Processors may encompass processor cores implemented on an integrated circuit with other components as a system on a chip (SOC 10) or other levels of integration. Processors may further encompass discrete microprocessors, processor cores and/or microprocessors integrated into multichip module implementations, processors implemented as multiple integrated circuits, etc.

The memory controller 22 may generally include the circuitry for receiving memory operations from the other components of the SOC 10 and for accessing the memory 12 to complete the memory operations. The memory controller 22 may be configured to access any type of memory 12. For example, the memory 12 may be static random access memory (SRAM), dynamic RAM (DRAM) such as synchronous DRAM (SDRAM) including double data rate (DDR, DDR2, DDR3, DDR4, etc.) DRAM. Low power/mobile versions of the DDR DRAM may be supported (e.g. LPDDR, mDDR, etc.). The memory controller 22 may include queues for memory operations, for ordering (and potentially reordering) the operations and presenting the operations to the memory 12. The memory controller 22 may further include data buffers to store write data awaiting write to memory and read data awaiting return to the source of the memory operation. In some embodiments, the memory controller 22 may include a memory cache to store recently accessed memory data. In SOC implementations, for example, the memory cache may reduce power consumption in the SOC by avoiding reaccess of data from the memory 12 if it is expected to be accessed again soon. In some cases, the memory cache may also be referred to as a system cache, as opposed to private caches such as the L2 cache or caches in the processors, which serve only certain components. Additionally, in some embodiments, a system cache need not be located within the memory controller 22.

The peripherals 18 may be any set of additional hardware functionality included in the SOC 10. For example, the peripherals 18 may include video peripherals such as an image signal processor configured to process image capture data from a camera or other image sensor, GPUs, video encoder/decoders, scalers, rotators, blenders, display controller, etc. The peripherals may include audio peripherals such as microphones, speakers, interfaces to microphones and speakers, audio processors, digital signal processors, mixers, etc. The peripherals may include interface controllers for various interfaces external to the SOC 10 including interfaces such as Universal Serial Bus (USB), peripheral component interconnect (PCI) including PCI Express (PCIe), serial and parallel ports, etc. The interconnection to external device is illustrated by the dashed arrow in FIG. 1 that extends external to the SOC 10. The peripherals may include networking peripherals such as media access controllers (MACs). Any set of hardware may be included.

The communication fabric 27 may be any communication interconnect and protocol for communicating among the components of the SOC 10. The communication fabric 27 may be bus-based, including shared bus configurations, cross bar configurations, and hierarchical buses with bridges. The communication fabric 27 may also be packet-based, and may be hierarchical with bridges, cross bar, point-to-point, or other interconnects.

It is noted that the number of components of the SOC 10 (and the number of subcomponents for those shown in FIG. 2, such as the processors 30 in each processor cluster 14A-14n may vary from embodiment to embodiment. Additionally, the number of processors 30 in one processor cluster 14A-14n may differ from the number of processors 30 in another processor cluster 14A-14n. There may be more or fewer of each component/subcomponent than the number shown in FIG. 5.

Figure 6:
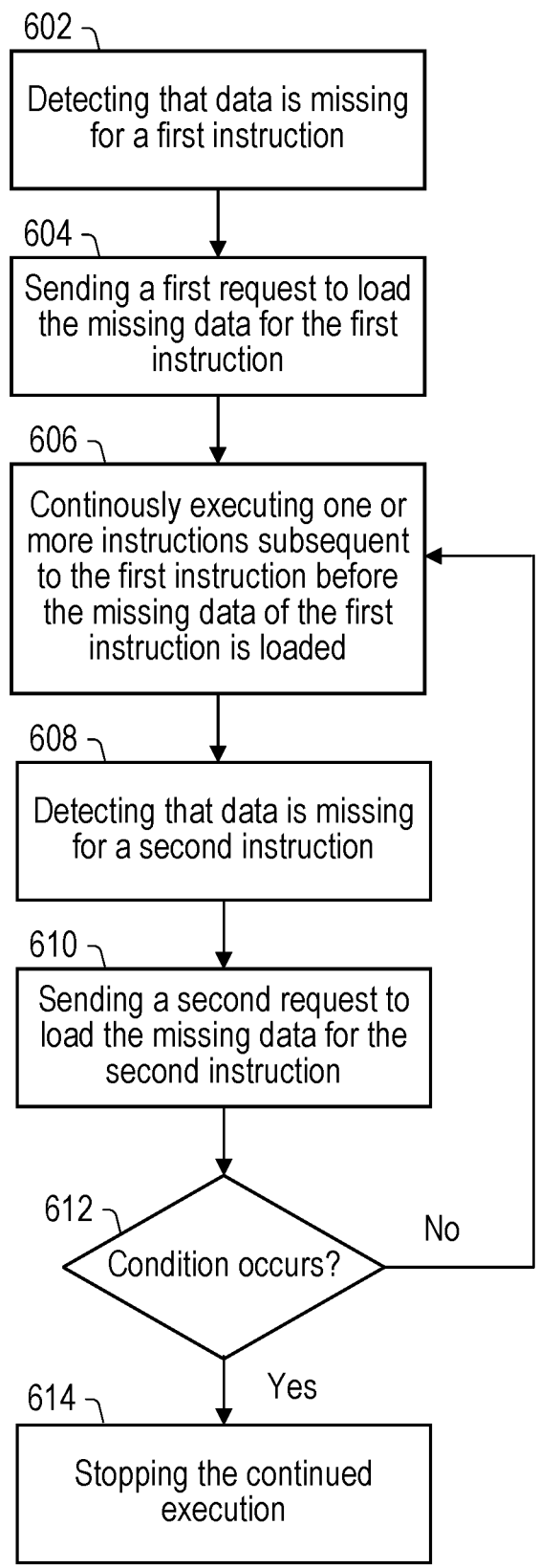
FIG. 6 is a flowchart illustrating one embodiment of operation of a processor including an instruction pipeline with a load miss management circuit.

Turning now to FIG. 6, a flowchart illustrating one example embodiment of the operation of a processor including an instruction pipeline with a load miss management circuit is shown. In the illustrated embodiment, the instruction pipeline (e.g., the instruction pipelines as described above) may be an in-order pipeline configured to execute instructions in order, e.g., according to a program order. As indicated in FIG. 6, during operation of the instruction pipeline, data may be detected to be missing for a first instruction, as indicated by block 602. In response, a first request may be sent by the instruction pipeline to load the missing data for the first instruction, as indicated by block 604. Instead of stalling operations, the instruction pipeline may continue executing one or more additional instruction subsequent to the first instruction before the missing data of the first instruction is loaded, as indicated by block 606. During the continued execution, data may be detected to be missing for a second instruction, as indicated by block 608. Similarly, a second request may be sent by the instruction pipeline to load the missing data for the second instruction, as indicated by block 610. The above operations may continue until occurrence of a condition is determined that prevents the continued execution, as indicated by block 612. In other words, whenever a load miss is detected for an additional instruction speculatively executed during the continued execution, the instruction pipeline may send a load request for the additional instruction and continue the speculative execution until occurrence of the condition is determined. As described above, there may be several possibilities to trigger the occurrence of the condition. For example, the condition may be triggered when the processor determines that execution of a later instruction depends on execution of an earlier instruction, missing data for instructions of different memory types are detected (as described above in FIG. 2), a later instruction attempts to access an intermediate result that is not available (e.g., in the bypass network), the number of instructions in an instruction queue exceeds a size limit of the instruction queue, and/or the first detected missing data is loaded.

Figure 7:
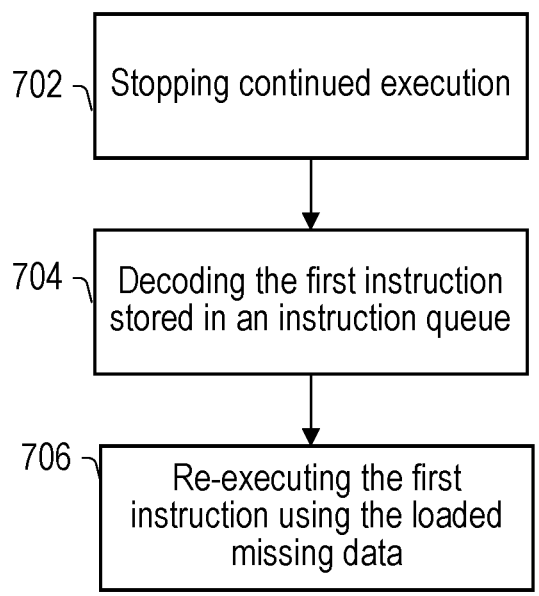
FIG. 7 is a flowchart illustrating another embodiment of operation of a processor including an instruction pipeline with a load miss management circuit.

Turning now to FIG. 7, a flowchart illustrating another example embodiment of operation of a processor including an instruction pipeline with a load miss management circuit is shown. In the illustrated embodiment, the instruction pipeline (e.g., the instruction pipelines as described above) may be an in-order pipeline configured to execute instructions in order. As indicated in FIG. 7, continued execution of instructions may be stopped by the instruction pipeline when it determines that a condition occurs that prevents the continued execution, as indicated by block 702. The instruction pipeline may then re-execute the instructions, starting from the first instruction with the first detected data missing. As indicated in FIG. 7, to re-execute, the first instruction stored in an instruction queue may be decoded, as indicated by block 704. The decoded first instruction may be sent to an execution unit and re-executed using the data that was previously missing but now loaded, as indicated by block 706. Also, as described above, sometimes all the instructions in the instruction queue may be re-executed. Alternatively, sometimes only instructions truly having load misses may be re-executed.

Figure 8:
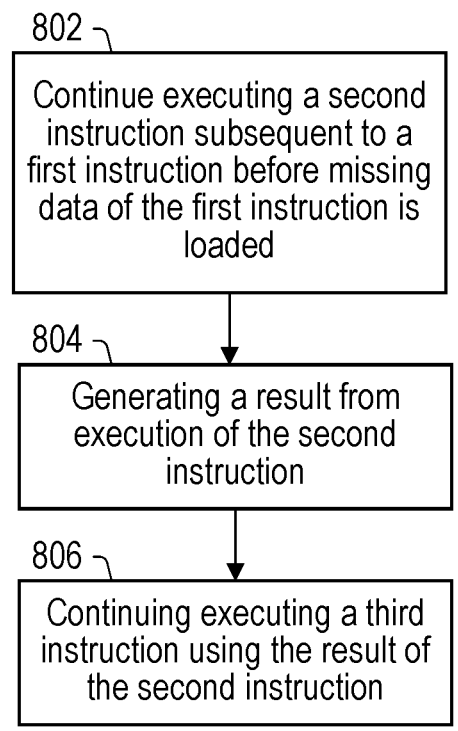
FIG. 8 is a flowchart illustrating still another example embodiment of operation of a processor including an instruction pipeline with a load miss management circuit.

Turning now to FIG. 8, a flowchart illustrating still another example embodiment of operation of a processor including an instruction pipeline with a load miss management circuit is shown. In the illustrated embodiment, the instruction pipeline (e.g., the instruction pipelines as described above) may be an in-order pipeline configured to execute instructions in order. As indicated in FIG. 8, after data is detected missing for a first instruction, one or more instructions, including a second instruction, subsequent to the first instruction may be executed by the instruction pipeline before the missing data of the first instruction is loaded, as indicated by block 802. An intermediate result may be generated from the continued execution of the second instruction, as indicated by block 804. The intermediate result may be transferred to a third instruction subsequent to the second instruction, e.g., through a bypass network, such that the third instruction may be executed using the intermediate result, as indicated by block 806.

Figure 9:
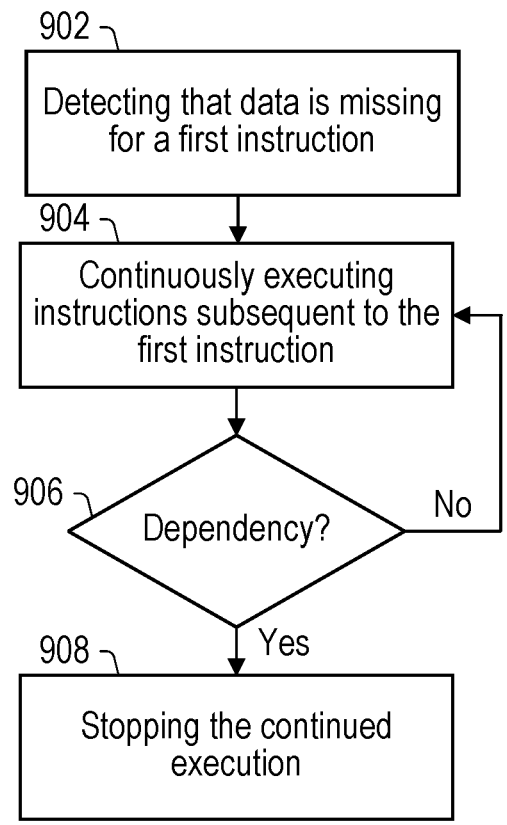
FIG. 9 is a flowchart illustrating an example embodiment of operation of a processor for determining that a missing data is required to be loaded.

Turning now to FIG. 9, a flowchart illustrating an example embodiment of operation of a processor for determining that a missing data is required to be loaded is shown. In the illustrated embodiment, the instruction pipeline (e.g., the instruction pipelines as described above) may be an in-order pipeline configured to execute instructions in order. As indicated in FIG. 9, data may be detected to be missing for a first instruction, as indicated by block 902. The instruction pipeline may continuously execute instructions subsequent to the first instruction, as indicated by block 904. Additionally, the instruction pipeline may determine whether the missing data of the first instruction is required by another instruction subsequent to the first instruction, as indicated by block 906. As described above, this may be a direct dependency, e.g., when the other instruction directly requires the missing data of the first instruction as an operand, or an indirect dependency, e.g., when the other instruction requires a result of the first instruction that further depends on a missing operand of the first instruction. Responsive to detecting such missing data of the first instruction is required by another instruction, the instruction pipeline may stop the continued execution, as indicated by block 908.

Figure 10:
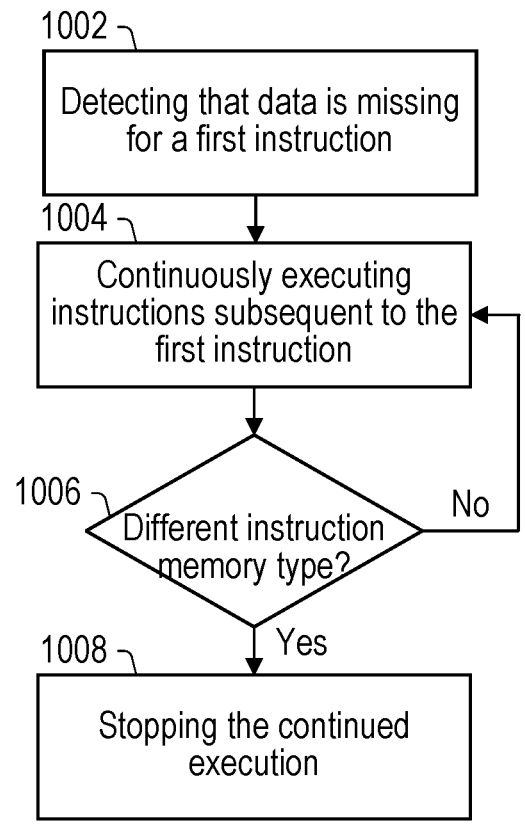
FIG. 10 is a flowchart illustrating another example embodiment of operation of a processor for determining that a missing data is required to be loaded.

Turning now to FIG. 10, a flowchart illustrating another example embodiment of operation of a processor for determining that a missing data is required to be loaded is shown. In the illustrated embodiment, the instruction pipeline (e.g., the instruction pipelines described above) may be an in-order pipeline configured to execute instructions in order. As indicated in FIG. 10, data may be detected to be missing for a first instruction, as indicated by block 1002. The instruction pipeline may continue to execute instructions subsequent to the first instruction, as indicated by block 1004. Additionally, the instruction pipeline may determine whether there is another instruction that also has missing data but corresponds to a different memory instruction type from the first instruction, as indicated by block 1006. As indicated above, sometimes the instruction pipeline may not necessarily mix load misses corresponding to different types of memory, e.g., not mix instructions with missing data in the cacheable memory 202, non-cacheable memory 204, and device memory 206. Responsive to detecting another instruction corresponding to a different memory instruction type, the instruction pipeline may stop the continued execution, as indicated by block 1008.

Computer System

Figure 11:
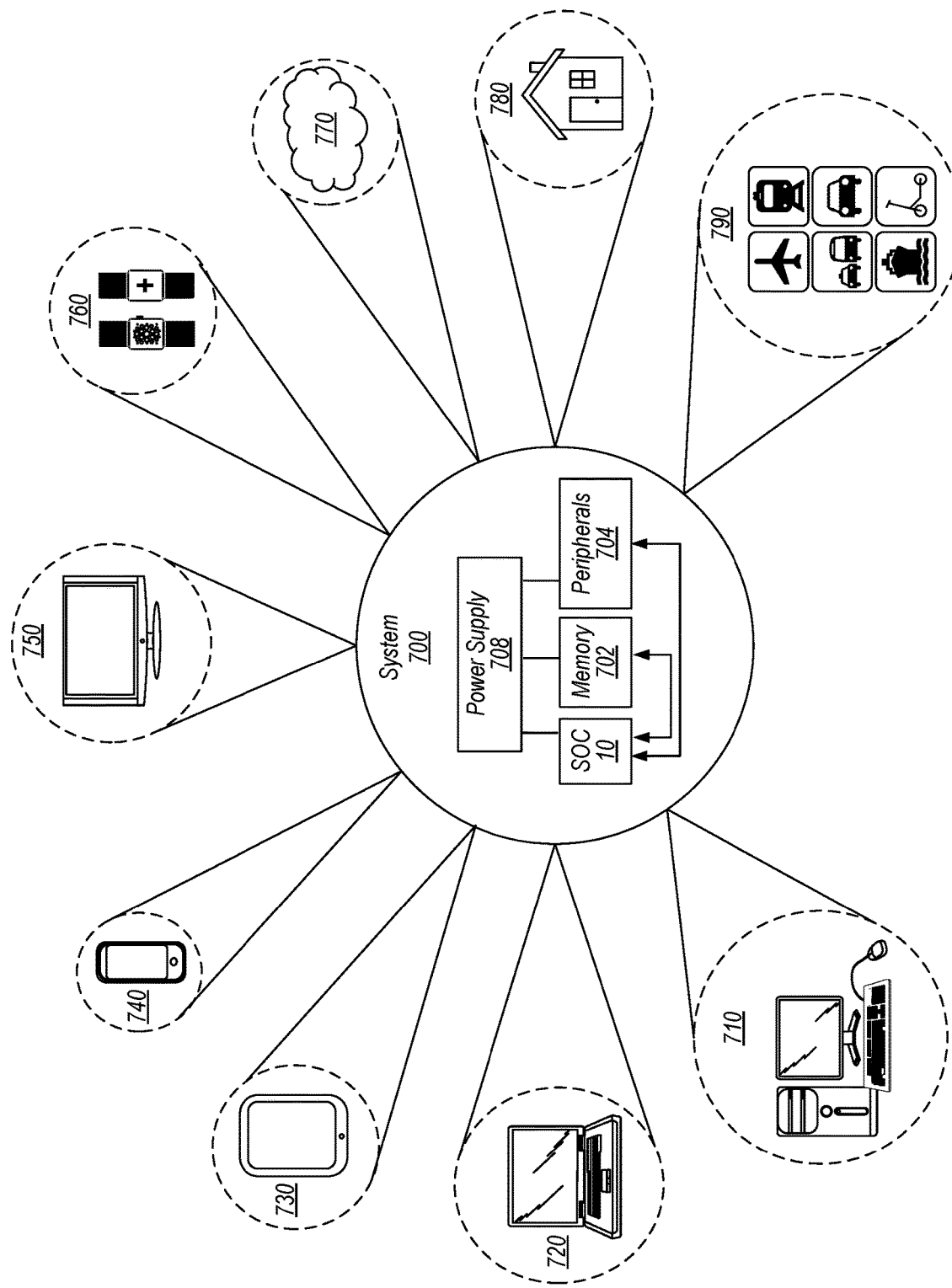
FIG. 11 is a block diagram of one embodiment of a system, including at least one instance of a system on a chip (SOC) in FIGS. 1-10, used in a variety of contexts.

Turning next to FIG. 11, a block diagram of one embodiment of a system 700 is shown. In the illustrated embodiment, the system 700 includes at least one instance of a system on a chip (SOC) 10 (as described above) coupled to one or more peripherals 704 and an external memory 702. A power supply (PMU) 708 is provided which supplies the supply voltages to the SOC 10 as well as one or more supply voltages to the memory 702 and/or the peripherals 154. In some embodiments, more than one instance of the SOC 10 (e.g., the SOCs 10A-10q) may be included (and more than one memory 702 may be included as well). The memory 702 may include the memory 12 described in FIGS. 1-10, in an embodiment.

The peripherals 704 may include any desired circuitry, depending on the type of system 700. For example, in one embodiment, the system 704 may be a mobile device (e.g., personal digital assistant (PDA), smart phone, etc.) and the peripherals 704 may include devices for various types of wireless communication, such as Wi-Fi, Bluetooth, cellular, global positioning system, etc. The peripherals 704 may also include additional storage, including RAM storage, solid state storage, or disk storage. The peripherals 704 may include user interface devices such as a display screen, including touch display screens or multitouch display screens, keyboard or other input devices, microphones, speakers, etc. In other embodiments, the system 700 may be any type of computing system (e.g., desktop personal computer, laptop, workstation, net top etc.).

The external memory 702 may include any type of memory. For example, the external memory 702 may be SRAM, dynamic RAM (DRAM) such as synchronous DRAM (SDRAM), double data rate (DDR, DDR2, DDR3, etc.) SDRAM, RAMBUS DRAM, low power versions of the DDR DRAM (e.g., LPDDR, mDDR, etc.), etc. The external memory 702 may include one or more memory modules to which the memory devices are mounted, such as single inline memory modules (SIMMs), dual inline memory modules (DIMMs), etc. Alternatively, the external memory 702 may include one or more memory devices that are mounted on the SOC 10 in a chip-on-chip or package-on-package implementation.

As illustrated, system 700 is shown to have application in a wide range of areas. For example, system 700 may be utilized as part of the chips, circuitry, components, etc., of a desktop computer 710, laptop computer 720, tablet computer 730, cellular or mobile phone 740, or television 750 (or set-top box coupled to a television). Also illustrated is a smartwatch and health monitoring device 760. In some embodiments, smartwatch may include a variety of general-purpose computing related functions. For example, smartwatch may provide access to email, cellphone service, a user calendar, and so on. In various embodiments, a health monitoring device may be a dedicated medical device or otherwise include dedicated health related functionality. For example, a health monitoring device may monitor a user's vital signs, track proximity of a user to other users for the purpose of epidemiological social distancing, contact tracing, provide communication to an emergency service in the event of a health crisis, and so on. In various embodiments, the above-mentioned smartwatch may or may not include some or any health monitoring related functions. Other wearable devices are contemplated as well, such as devices worn around the neck, devices that are implantable in the human body, glasses designed to provide an augmented and/or virtual reality experience, and so on.

System 700 may further be used as part of a cloud-based service(s) 770. For example, the previously mentioned devices, and/or other devices, may access computing resources in the cloud (i.e., remotely located hardware and/or software resources). Still further, system 700 may be utilized in one or more devices of a home other than those previously mentioned. For example, appliances within the home may monitor and detect conditions that warrant attention. For example, various devices within the home (e.g., a refrigerator, a cooling system, etc.) may monitor the status of the device and provide an alert to the homeowner (or, for example, a repair facility) should a particular event be detected. Alternatively, a thermostat may monitor the temperature in the home and may automate adjustments to a heating/cooling system based on a history of responses to various conditions by the homeowner. Also illustrated in FIG. 11 is the application of system 700 to various modes of transportation. For example, system 700 may be used in the control and/or entertainment systems of aircraft, trains, buses, cars for hire, private automobiles, waterborne vessels from private boats to cruise liners, scooters (for rent or owned), and so on. In various cases, system 700 may be used to provide automated guidance (e.g., self-driving vehicles), general systems control, and otherwise. These any many other embodiments are possible and are contemplated. It is noted that the devices and applications illustrated in FIG. 11 are illustrative only and are not intended to be limiting. Other devices are possible and are contemplated.

Computer Readable Storage Medium

Figure 12:
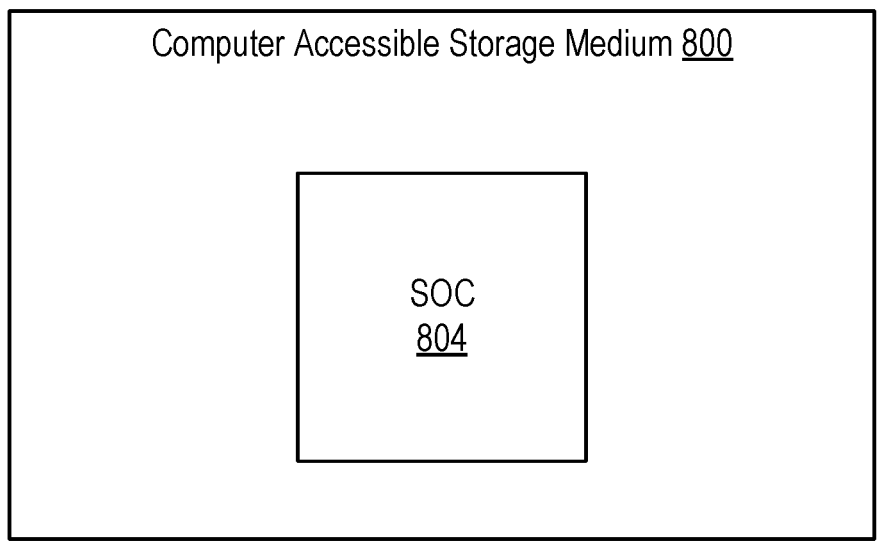
FIG. 12 is a block diagram of a computer accessible storage medium that may store a database representative of a system on a chip (SOC) in FIGS. 1-11.

Turning now to FIG. 12, a block diagram of one embodiment of a computer readable storage medium 800 is shown. Generally speaking, a computer accessible storage medium may include any storage media accessible by a computer during use to provide instructions and/or data to the computer. For example, a computer accessible storage medium may include storage media such as magnetic or optical media, e.g., disk (fixed or removable), tape, CD-ROM, DVD-ROM, CD-R, CD-RW, DVD-R, DVD-RW, or Blu-Ray. Storage media may further include volatile or non-volatile memory media such as RAM (e.g., synchronous dynamic RAM (SDRAM), Rambus DRAM (RDRAM), static RAM (SRAM), etc.), ROM, or Flash memory. The storage media may be physically included within the computer to which the storage media provides instructions/data. Alternatively, the storage media may be connected to the computer. For example, the storage media may be connected to the computer over a network or wireless link, such as network attached storage. The storage media may be connected through a peripheral interface such as the Universal Serial Bus (USB). Generally, the computer accessible storage medium 800 may store data in a non-transitory manner, where non-transitory in this context may refer to not transmitting the instructions/data on a signal. For example, non-transitory storage may be volatile (and may lose the stored instructions/data in response to a power down) or non-volatile.

The computer accessible storage medium 800 in FIG. 12 may store a database 804 representative of the SOC 10 described above. Generally, the database 804 may be a database which can be read by a program and used, directly or indirectly, to fabricate the hardware comprising the SOC 10. For example, the database may be a behavioral-level description or register-transfer level (RTL) description of the hardware functionality in a high-level design language (HDL) such as Verilog or VHDL. The description may be read by a synthesis tool which may synthesize the description to produce a netlist comprising a list of gates from a synthesis library. The netlist comprises a set of gates which also represent the functionality of the hardware comprising the SOC 10. The netlist may then be placed and routed to produce a data set describing geometric shapes to be applied to masks. The masks may then be used in various semiconductor fabrication steps to produce a semiconductor circuit or circuits corresponding to the SOC 10. Alternatively, the database 804 on the computer accessible storage medium 800 may be the netlist (with or without the synthesis library) or the data set, as desired.

While the computer accessible storage medium 800 stores a representation of the SOC 10, other embodiments may carry a representation of any portion of the SOC 10, as desired, including any subset of the components described above. The database 804 may represent any portion of the above.

The present disclosure includes references to "an "embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" or is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of task or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

Different "circuits" may be described in this disclosure. These circuits or "circuitry" constitute hardware that includes various types of circuit elements, such as combinatorial logic, clocked storage devices (e.g., flip-flops, registers, latches, etc.), finite state machines, memory (e.g., random-access memory, embedded dynamic random-access memory), programmable logic arrays, and so on. Circuitry may be custom designed, or taken from standard libraries. In various implementations, circuitry can, as appropriate, include digital components, analog components, or a combination of both. Certain types of circuits may be commonly referred to as "units" (e.g., a decode unit, an arithmetic logic unit (ALU), functional unit, memory management unit (MMU), etc.). Such units also refer to circuits or circuitry.

The disclosed circuits/units/components and other elements illustrated in the drawings and described herein thus include hardware elements such as those described in the preceding paragraph. In many instances, the internal arrangement of hardware elements within a particular circuit may be specified by describing the function of that circuit. For example, a particular "decode unit" may be described as performing the function of "processing an opcode of an instruction and routing that instruction to one or more of a plurality of functional units," which means that the decode unit is "configured to" perform this function. This specification of function is sufficient, to those skilled in the computer arts, to connote a set of possible structures for the circuit.

In various embodiments, as discussed in the preceding paragraph, circuits, units, and other elements defined by the functions or operations that they are configured to implement, The arrangement and such circuits/units/components with respect to each other and the manner in which they interact form a microarchitectural definition of the hardware that is ultimately manufactured in an integrated circuit or programmed into an FPGA to form a physical implementation of the microarchitectural definition. Thus, the microarchitectural definition is recognized by those of skill in the art as structure from which many physical implementations may be derived, all of which fall into the broader structure described by the microarchitectural definition. That is, a skilled artisan presented with the microarchitectural definition supplied in accordance with this disclosure may, without undue experimentation and with the application of ordinary skill, implement the structure by coding the description of the circuits/units/components in a hardware description language (HDL) such as Verilog or VHDL. The HDL description is often expressed in a fashion that may appear to be functional. But to those of skill in the art in this field, this HDL description is the manner that is used transform the structure of a circuit, unit, or component to the next level of implementational detail. Such an HDL description may take the form of behavioral code (which is typically not synthesizable), register transfer language (RTL) code (which, in contrast to behavioral code, is typically synthesizable), or structural code (e.g., a netlist specifying logic gates and their connectivity). The HDL description may subsequently be synthesized against a library of cells designed for a given integrated circuit fabrication technology, and may be modified for timing, power, and other reasons to result in a final design database that is transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and other circuit elements (e.g., passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA. This decoupling between the design of a group of circuits and the subsequent low-level implementation of these circuits commonly results in the scenario in which the circuit or logic designer never specifies a particular set of structures for the low-level implementation beyond a description of what the circuit is configured to do, as this process is performed at a different stage of the circuit implementation process.

The fact that many different low-level combinations of circuit elements may be used to implement the same specification of a circuit results in a large number of equivalent structures for that circuit. As noted, these low-level circuit implementations may vary according to changes in the fabrication technology, the foundry selected to manufacture the integrated circuit, the library of cells provided for a particular project, etc. In many cases, the choices made by different design tools or methodologies to produce these different implementations may be arbitrary.

Moreover, it is common for a single implementation of a particular functional specification of a circuit to include, for a given embodiment, a large number of devices (e.g., millions of transistors). Accordingly, the sheer volume of this information makes it impractical to provide a full recitation of the low-level structure used to implement a single embodiment, let alone the vast array of equivalent possible implementations. For this reason, the present disclosure describes structure of circuits using the functional shorthand commonly employed in the industry.

Numerous variations and modifications will become apparent to those skilled in the art once the above disclosure is fully appreciated. It is intended that the following claims be interpreted to embrace all such variations and modifications.

What is claimed is:

1. A processor, comprising:
an instruction pipeline configured to execute a sequence of instructions in-order, wherein the sequence of instructions comprises a first instruction and one or more instructions following the first instruction in program order, and to execute the sequence of instructions the instruction pipeline is configured to:
detect, during execution, that data is missing for a first instruction; and after a detection that the data is missing for the first instruction:
send a first request to load the missing data for the first instruction;
while waiting for the missing data of the first instruction to be loaded:
speculatively execute the one or more instructions and during the speculative execution:
determine that data is missing for a second instruction;
send a second request to load the missing data for the second instruction; and
responsive to determining that a condition occurs that prevents the speculative execution, stop execution of the instruction pipeline until the missing data for the first instruction is available; and
re-execute the sequence of instructions in-order starting at the first instruction.

2. The processor of claim 1, wherein the instruction pipeline is configured to determine that the condition occurs based on a determination that the missing data of the first instruction is required by another instruction of the sequence of instructions.

3. The processor of claim 1, wherein the instruction pipeline is configured to:
detect that data is missing for a third instruction during the speculative execution; and
determine that the condition occurs based on a determination that the third instruction corresponds to a different memory instruction type from the first instruction.

4. The processor of claim 1, wherein during the speculative execution, the instruction pipeline is configured to:
generate a result from execution of a third instruction; and
execute a fourth instruction using the result of the third instruction.

5. The processor of claim 1, wherein responsive to a determination that the condition occurs, the instruction pipeline is configured to re-execute the sequence of instructions using the missing data loaded for the first instruction.

6. The processor of claim 5, further comprising:
an instruction buffer configured to store the first instruction after the detection that the data is missing for the first instruction,
wherein to re-execute the first instruction, the instruction pipeline is configured to decode the first instruction stored in the instruction buffer.

7. The processor of claim 1, wherein the instruction pipeline is configured to:
determine that the missing data of the second instruction corresponds to a cache line of non-cacheable memory same as the missing data of the first instruction; and
responsive to a determination that the missing data of the first instruction and second instruction correspond to the same cache line of the non-cacheable memory, combine the first request and second request into one request.

8. The processor of claim 1, further comprising:
a level 1 (L1) instruction cache configured to store instructions;
a level 1 (L1) data cache configured to store data for the instructions; and
a bus interface unit coupled operatively between the L1 instruction and data caches and other memory accessible by the instruction pipeline, wherein the bus interface unit is configured to order the missing data that are loaded responsive to the first and second requests so that the missing data are loaded into the instruction pipeline in-order for the first and second instructions.

9. A device, comprising:
memory storing program instructions, the program instructions comprising a sequence of instructions including a first program instruction and one or more program instructions following the first program instruction in program order; and
a processor comprising an instruction pipeline configured to execute the sequence of instructions in-order, and wherein the instruction pipeline is configured to:
   detect, during execution, that data is missing for a first program instruction; and after a detection that the data is missing for the first program instruction:
      send a first request to load the missing data for the first program instruction;
      while waiting for the missing data of the first program instruction to be loaded:
         speculatively execute the one or more program instructions and during the continued execution:
            determine that data is missing for a second program instruction;
            send a second request to load the missing data for the second program instruction; and
            responsive to determining that a condition occurs that prevents the speculative execution, stop execution of the instruction pipeline until the missing data for the first instruction is available; and
         re-execute the sequence of instructions in-order starting at the first program instruction.

10. The device of claim 9, wherein the instruction pipeline is configured to determine that the condition occurs based on a determination that the missing data of the first program instruction is required by another program instruction of the sequence of instructions.

11. The device of claim 9, wherein the instruction pipeline is configured to:
   detect that data is missing for a third program instruction during the speculative execution; and
   determine that the condition occurs based on a determination that the third program instruction corresponds to a different memory type from the first program instruction.

12. The device of claim 9, wherein during the speculative execution, the instruction pipeline is configured to:
   generate a result from execution of a third program instruction; and
   execute a fourth program instruction using the result of the third program instruction.

13. The device of claim 9, wherein responsive to a determination that the condition occurs, the instruction pipeline is configured to re-execute the sequence of instructions using the missing data loaded for the first program instruction.

14. The device of claim 13, further comprising:
an instruction buffer configured to store the first program instruction after the detection that the data is missing for the first program instruction,
wherein to re-execute the first program instruction, the instruction pipeline is configured to decode the first program instruction stored in the instruction buffer.

15. The device of claim 9, further comprising:
a level 1 (L1) instruction cache configured to store program instructions;
a level 1 (L1) data cache configured to store data for the program instructions; and
a bus interface unit coupled operatively between the L1 instruction and data caches and other memory accessible by the instruction pipeline, wherein the bus interface unit is configured to order the missing data that are loaded responsive to the first and second requests so that the missing data are loaded into the instruction pipeline in-order for the first and second program instructions.

16. A method, comprising:
detecting, by an instruction pipeline of a processor that executes a sequence of instructions in-order, that data is missing for a first instruction, wherein the sequence of instructions comprises the first instruction and one or more instructions following the first instruction in program order, and after detecting that the data is missing for the first instruction:
   sending, by the instruction pipeline, a first request to load the missing data for the first instruction;
   while waiting for the missing data of the first instruction to be loaded:
      speculatively executing, by the instruction pipeline, the one or more instructions and during the continued execution:
         determining that data is missing for a second instruction;
         sending a second request to load the missing data for the second instruction; and
         responsive to determining that a condition occurs that prevents the speculative execution, stopping execution of the instruction pipeline until the missing data for the first instruction is available;
   re-executing the sequence of instructions in-order starting at the first instruction.

17. The method of claim 16, wherein determining that the condition occurs comprises determining that the missing data of the first instruction is required by another instruction of the sequence of instructions.

18. The method of claim 16, further comprising:
detecting that data is missing for a third instruction during the speculative execution,
wherein determining that the condition occurs comprises determining that the missing data of the first instruction is required by another instruction of the sequence of instructions.

19. The method of claim 16, further comprising:
during the speculative execution:
   generating a result from execution of a third instruction; and
   executing a fourth instruction using the result of the third instruction.

20. The method of claim 16, further comprising:
responsive to determining that the condition occurs:
   decoding the first instruction stored in an instruction buffer of the instruction pipeline; and
   re-executing the sequence of instructions in-order starting at the first instruction using the missing data loaded for the first instruction.

* * * * *